United States Patent [19]

Tanaka

[11] Patent Number: 5,035,493
[45] Date of Patent: Jul. 30, 1991

[54] ZOOMING OPERATION APPARATUS OF ZOOM LENS

[75] Inventor: Osamu Tanaka, Osaka, Japan

[73] Assignee: Minolta Camera Kabushiki Kaisha, Osaka, Japan

[21] Appl. No.: 351,053

[22] Filed: May 12, 1989

[30] Foreign Application Priority Data

May 14, 1988 [JP] Japan .................. 63-117959

[51] Int. Cl.[5] ............................................ G02B 15/00
[52] U.S. Cl. .............................. 350/429; 354/195.12
[58] Field of Search ............... 350/429, 430, 255; 354/195.12, 400

[56] References Cited

U.S. PATENT DOCUMENTS

| | | | |
|---|---|---|---|
| 4,275,952 | 6/1981 | Uesugi | 350/429 |
| 4,759,618 | 7/1988 | Kamata | 350/429 |

FOREIGN PATENT DOCUMENTS 57-139907  9/1982  Japan .
57-150804  9/1982  Japan .
60-172115  11/1985  Japan .

Primary Examiner—Rodney B. Bovernick
Assistant Examiner—Loha Ben
Attorney, Agent, or Firm—Joseph W. Price

[57] ABSTRACT

A zooming operation apparatus of zoom lens is provided with a first and a second zoom driving mechanism. The first zoom driving mechanism is formed at an engaging section where the rotation of a zooming operation ring which is only rotatably held by a stationary barrel is engaged with a zoom cam ring which is only rectilinearly movably held by the stationary barrel inside the zooming operation ring and at a position between the zoom cam ring and the stationary barrel thereby converting the rotation of the zooming operation ring into the rectilinear movement of the zoom cam ring. The zoom cam ring incorporatively moves a first lens unit with the rectilinear movement. The second zoom driving mechanism is formed at a position between the zoom cam ring and the stationary barrel, and converts the rectilinear movement of the zoom cam ring into another rectilinear movement of a second lens unit. Zooming operation is thus carried out by the rectilinear movement of the first and second lens units.

18 Claims, 5 Drawing Sheets

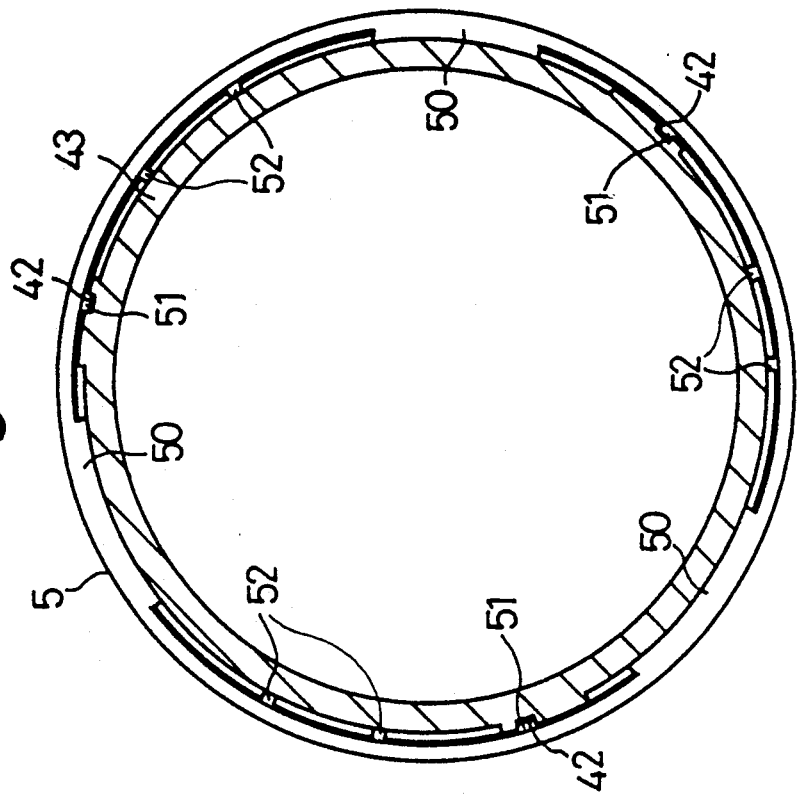
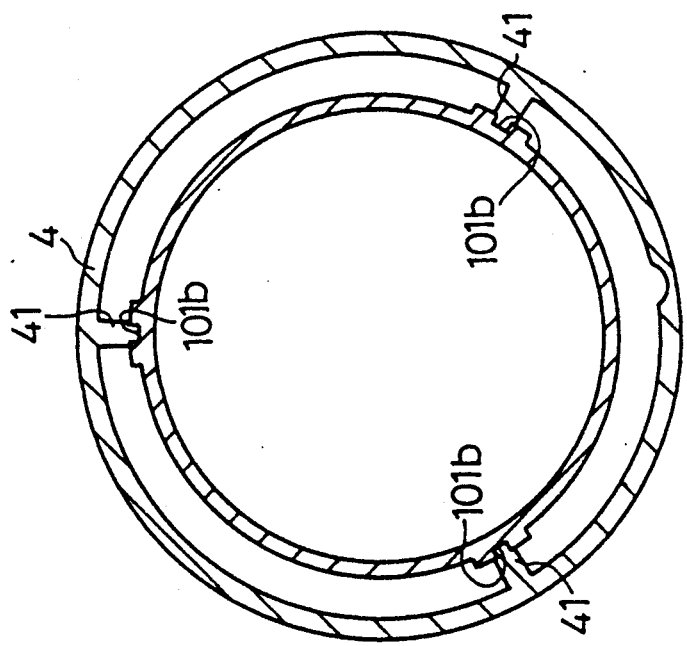

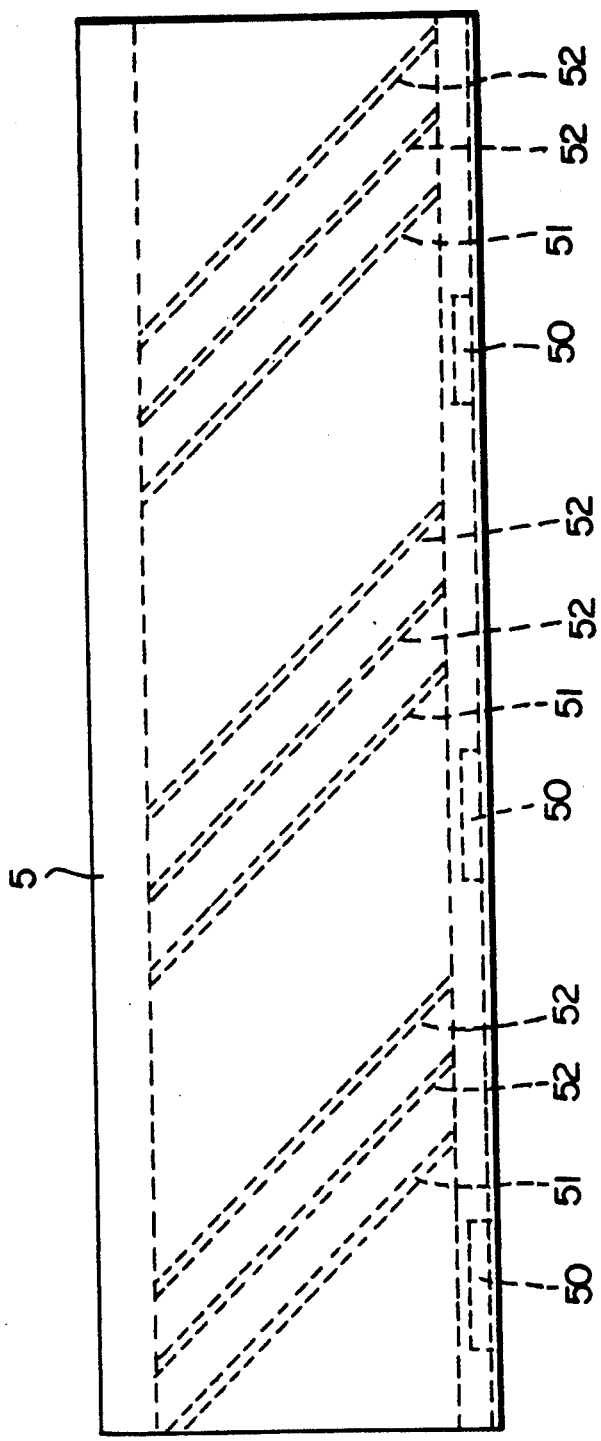

ZOOMING OPERATION APPARATUS OF ZOOM LENS

BACKGROUND OF THE INVENTION

1. Technical Field of the Invention

The present invention relates to a zooming operation apparatus for use mainly in various kinds of cameras, and more particularly to a zooming operation apparatus of zoom lens specially provided with a rotary zooming operation ring.

2. Brief Description of Related Art

With recent practical utilization of cameras provided with automatic focusing function, zoom lenses capable of performing automatic focusing operation has been introduced. In the focusing mechanism by use of a zoom lens, the method of moving a first lens group which is most closely positioned to an object has heretofore been mainly adapted. However, in case the method is applied to a zoom lens capable of performing automatic focusing operation, a driving system needs to be provided for overall length of a body tube (lens barrel) since the driving force of a motor disposed in a camera body is transmitted to the first lens group thereby causing the body tube to become bulky.

On the other hand, in order to lighten the weight of the body tube and also to reduce its manufacturing cost, it has been tried to replace the metallic material used for the body tube with such material as synthetic resin which is light in weight and low in material cost. However, the material should be thick enough to insure its strength which causes the body tube to become bulky.

FIG. 1 shows a well-known zooming operation apparatus which is applied to a zoom lens capable of performing automatic focusing operation. It is arranged to firstly transmit the rotation of a zoom ring (a) held on an outer periphery (i) of a stationary barrel to a zoom cam ring (f). Then, the rotation of the zoom cam ring (f) is converted into a rectilinear movement of a first lens group (b) and a second lens group (e) respectively.

A focusing ring (g) which is a part of a focusing mechanism reaches the inside rear portion of outer periphery (i) of the stationary barrel, i.e. at the side of image plane to connect with a driving gear (j) ready for automatic focusing. The driving gear (j) is connected to a coupler (1) which is engaged with a coupler of driving system on the side of a camera body through a reduction gear (k).

However, the zoom cam ring (f) is rotated relative to the stationary barrel, and therefore, it is required to convert the rotation into rectilinear movement of the first lens group (b) and the second lens group (e). Accordingly, a straight groove (m) for a sleeve (h) of the stationary barrel and cam grooves (n),(o) which contact the groove (m) have to be provided in the zoom cam ring (f), and cam follower pins (p),(q) which engage with the straight groove (m) and the cam grooves (n),(o) are required.

Furthermore, lens holding frames for holding the first lens group (b) and the second lens group (e) need to be connected to the cam followers pins (p),(q) respectively at the inner peripheral side of the sleeve (h). Accordingly, the holding frames, sleeve (h), zoom cam ring (f), focusing ring (g), zoom ring (a) and the like are overlapped around an optical axis which leads to increasing the number of parts thereby causing the body tube to become bulky and the lens inevitably becomes large. It is therefore necessary to consider that the cam grooves (n),(o) and the cam follower pins (p),(q) do not interfere and affect each other, so that the degree of freedom is lowered in designing.

SUMMARY OF THE INVENTION

An object of the present invention is to provide a zooming operation apparatus of zoom lens wherein a body tube is made substantially compact by simplifying a structure which moves lenses when zooming operation is carried out.

Another object of the present invention is to provide a zooming operation apparatus of zoom lens provided with the most suitable structure for automatic focusing cameras.

These and other objects and features of the present invention will become more apparent from the following description taken in conjunction with the accompanying drawings which illustrate specific embodiments of the invention.

BRIEF DESCRIPTION OF THE DRAWINGS

FIG. 3 is a fragmentary cross-sectional view taken along line III—III in FIG. 2.

FIG. 4 is a fragmentary cross-sectional view taken along line IV—IV in FIG. 2.

FIG. 5 is a developed view of a zooming operation ring.

DESCRIPTION OF THE PREFERRED EMBODIMENT

An embodiment of the present invention will now be described below.

Figure 1:
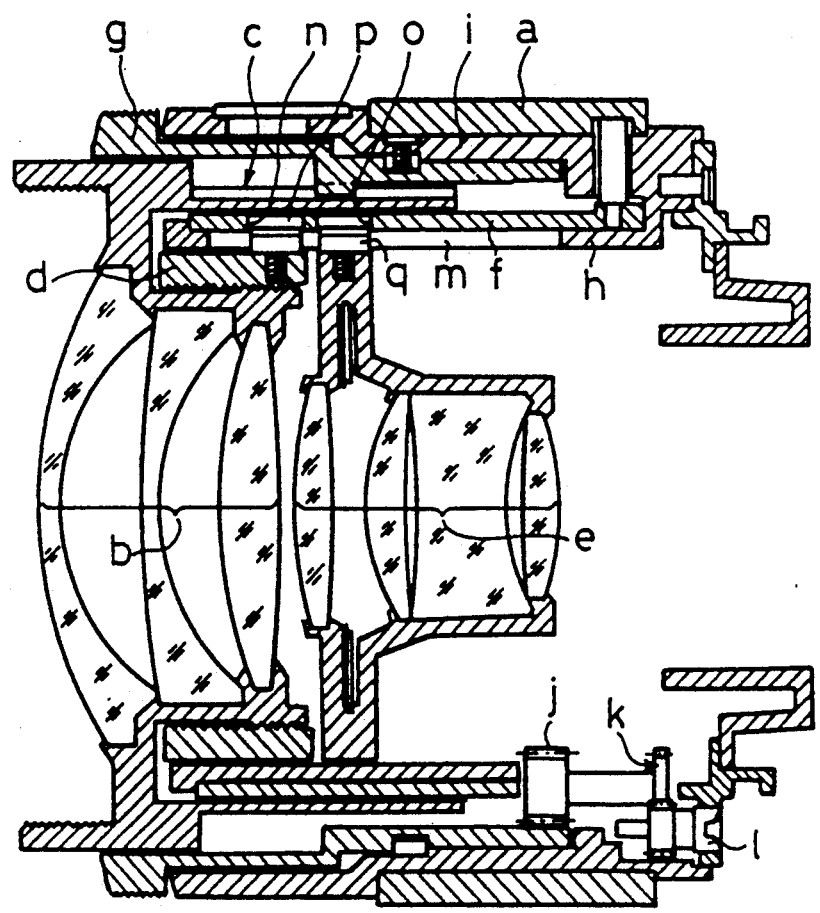
FIG. 1 is a longitudinal sectional view showing a conventional zoom lens capable of performing an automatic focusing operation.
Figure 2:
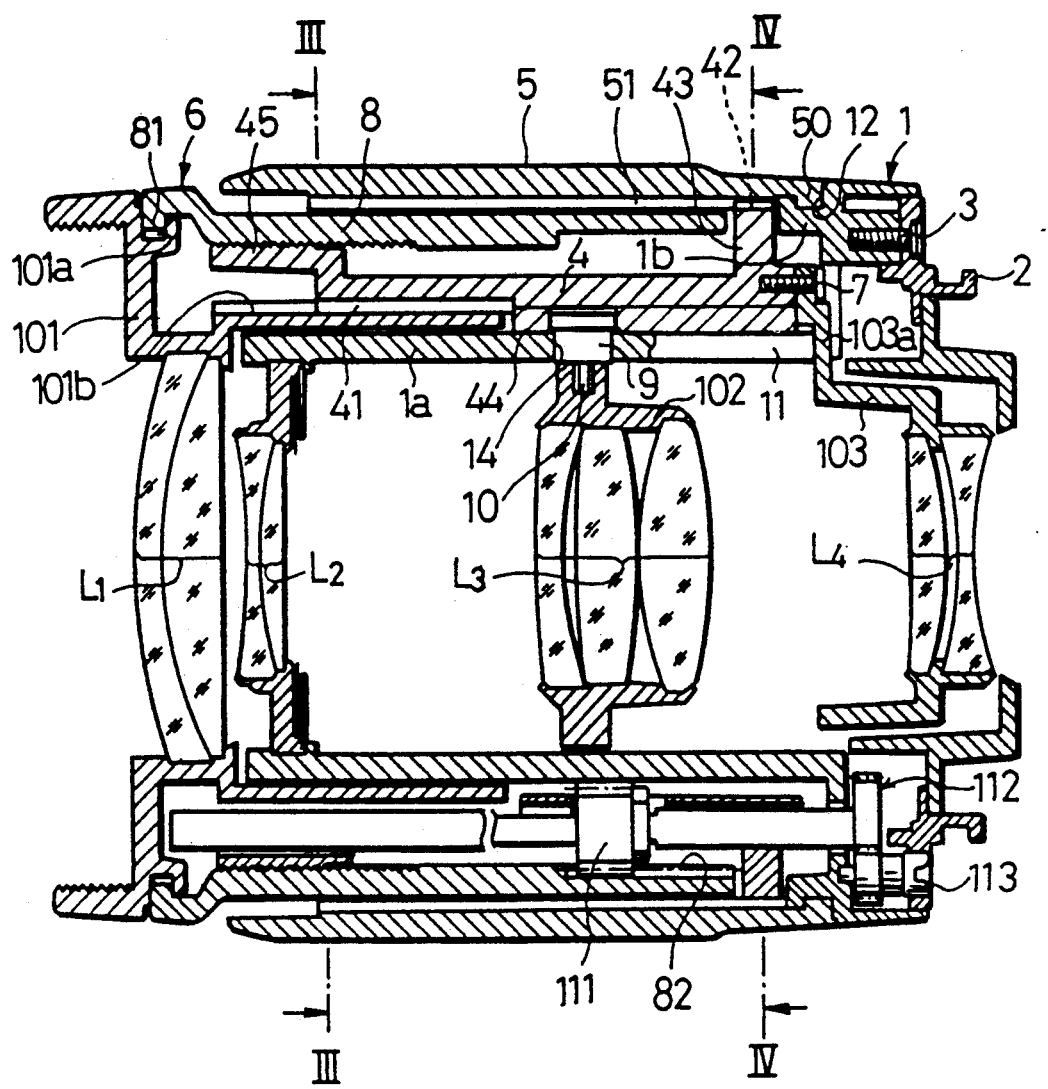
FIG. 2 is a longitudinal sectional view showing a zoom lens capable of performing an automatic focusing operation adapted to a zooming operation apparatus in an embodiment of the present invention.

As shown in FIG. 2, the embodiment is provided with a zoom lens assembly capable of performing automatic focusing operation with first through fourth lens groups, $L_1$, $L_2$, $L_3$ and $L_4$ arranged successively in order from the side of a subject.

A stationary barrel 1 which is connected and fixed to the mount of a camera body is provided with an inner tube 1a and an extremely short outer tube 1b positioned outside the inner tube 1a and on the side of image plane. At the rear end of the outer tube 1b, a mount 2 for connecting with the camera body is coupled by a screw 3. A second lens group $L_2$ is immovably installed at the front end of the inner tube 1a.

A zoom cam ring 4 is fitted and held on the outer periphery of the inner tube 1a so as to be guided by a straight groove 11 which is parallel to the optical axis of the lens assembly and formed in the inner tube 1a through a coupling arm 103a of a holding frame 103 which holds the fourth lens group $L_4$, while a zooming operation ring 5 is fitted and held on the outer periphery of the outer tube 1b at its inwardly projected piece portion 50 so as to be guided by a ring groove 12 of the outer tube 1b.

The zoom cam ring 4 holds the first lens group $L_1$ through a focusing operation ring 6 at the front end portion, and the fourth lens group $L_4$ is connected and held at its rear end portion.

A focusing mechanism comprises the focusing operation ring 6 provided with a helicoid screw in its inner periphery and a helicoid screw portion 45 of the zoom cam ring 4 which is engaged with the helicoid screw of the ring 6. The first lens group $L_1$ is held by a holding frame 101, and the frame 101 is fitted and held in the inner periphery of the front end portion of the zoom cam ring 4 so as to be guided by straight guides 41 formed in the zoom cam ring 4, while the outer periphery of the front end portion of the holding frame 101 is fitted in an inwardly projected piece 81 of the focusing operation ring 6 and a ring groove 101a.

The straight guides 41 are formed at three locations in the circumferential direction as shown in FIG. 3 and are engaged with concaved projections 101b formed on the outer periphery of rear end portion of the holding frame 101. Accordingly, when the focusing operation ring 6 is rotated, the holding frame 101 is moved toward and away from the zoom cam ring 4 by the action of the focusing mechanism 8 and the straight guides 41, and the first lens group $L_1$ is singly moved in the direction of the optical axis for a focusing operation.

The fourth lens group $L_4$ is positioned inside the inner tube 1a with its holding frame 103 and is connected with the zoom cam ring 4, wherein the coupling arm 103a of the holding frame 103 extends to the outside of the inner tube 1a through the straight groove 11 formed in the inner tube 1a and is connected with the rear end portion of the zoom cam ring 4 by a screw 7. The zoom cam ring 4 is then guided by the straight groove 11 through the coupling arm 103a to move rectilinearly only.

On the other hand, cams in convex projection 51 are formed at three locations in the inner periphery of the zooming operation ring 5 in the circumferential direction as shown in FIG. 4 and are engaged with passive concaved pits 42 formed at three locations on the outer periphery of the rear end flange portion 43 of the zoom cam ring 4 in the circumferential direction as shown in FIG. 4. Accordingly, when the zooming operation ring 5 is rotated, the zoom cam ring 4 is moved in the axial direction corresponding to the lead of the convex projection 51 through the passive concaved pit 42. Accordingly, at the time when zooming operation is carried out, where the zooming operation ring 5 is operated, the first and fourth lens groups $L_1$ and $L_4$ are incorporatively moved with the zoom cam ring 4 in the direction of the optical axis.

Also in the inner periphery of the zooming operation ring 5, two convex projections 52 for fitting on the zoom cam ring are formed between two consecutive convex projections 51 as shown in the cross-sectional view of FIG. 4 and in the developed view of FIG. 5, and the zooming operation ring 5 is fitted on the outer periphery of the flange portion 43 of the zoom cam ring 4 by the convex projection 52.

Inwardly projected pieces 50 are formed at three locations in the circumferential direction as shown in FIGS. 4 and 5 and joined, bayonet fashion, to a ring groove 12 by which it does not come off by an ordinary operating angle. The relationship between projected pieces 81 of the focusing operation ring 6 and the ring groove 101a is the same. The cams in convex projections 51 and the convex projections 52 are made in the same leading state as shown in FIG. 5 so that there will be no interference when the zooming operation ring 5 is taken out of a mold at a molding process of the zooming operation ring 5. Manufacturing accuracy is required on the surface of both sides of each convex projection 51, and manufacturing accuracy is required on the tip of the convex projection 52.

The third lens group $L_3$ is positioned inside the inner tube 1a with its holding frame 102, and the frame 102 is engaged with cam slots 14 formed on the inner tube 1a at three locations in the circumferential direction and is held by a passive pin 9 so that the holding frame 102 is prevented from getting into inside the inner tube 1a, and is moved corresponding to the movement of the passive pin 9 along the cam slot 14. The passive pin 9 is also engaged with the cam groove 44 formed in the inner periphery of the zoom cam ring 4. Accordingly, when the zoom cam ring 4 is rectilinearly moved corresponding to the rotation of the zooming operation ring 5, the passive pin 9 is pushed by the cam slot 14, and is moved in the axial direction corresponding to the lead of the cam slot 14. The third lens group $L_3$ is thus moved in the axial direction.

When the zooming operation ring 5 is operated in the manner as aforementioned, the first and fourth lens groups $L_1$ and $L_4$ are incorporatively moved by the zoom cam ring 4 and the third lens group $L_3$ is moved independently. The zooming operation is thus carried out with these movements, which will be described referring to the developed views in FIGS. 6 and 7.

Figure 7:
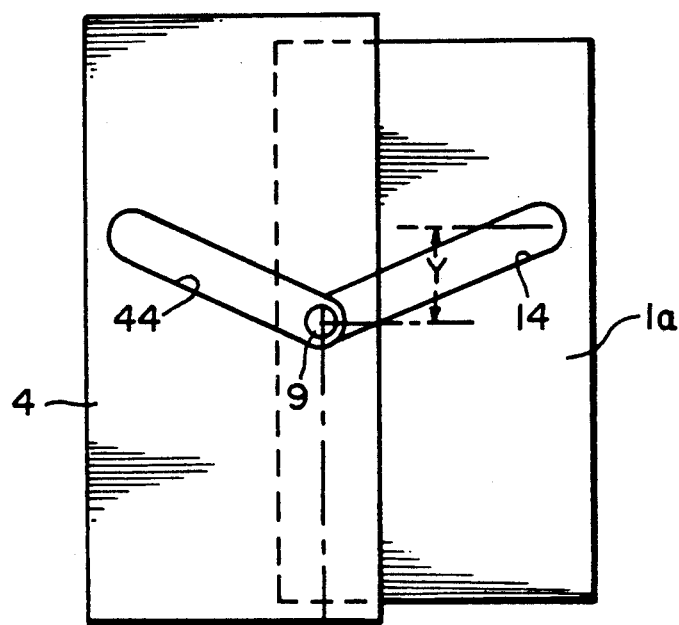
FIGS. 6 and 7 are developed views of a stationary, barrel (cylinder) and a zooming cam ring showing the states when zooming operation ring is positioned at the most wide angle and the most tele-angle.
Figure 6:
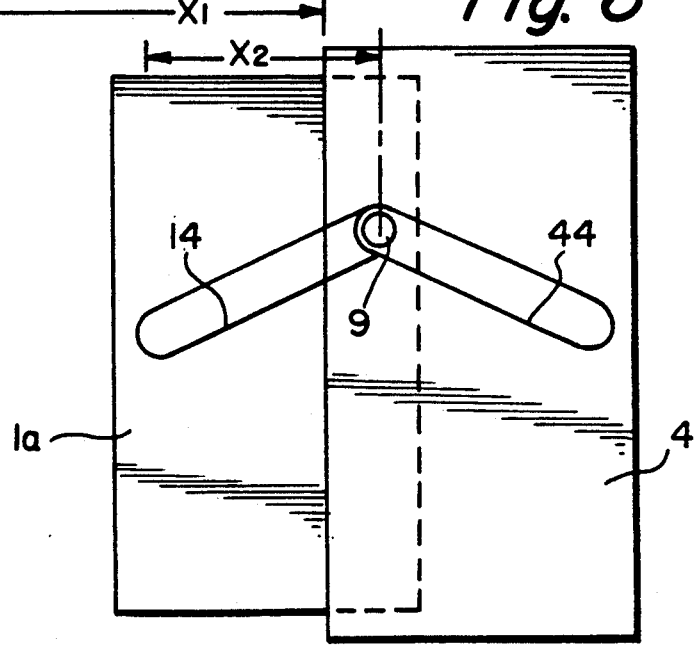

FIG. 6 shows a state of the most wide angle corresponding to FIG. 2, and when the zoom cam ring 4 is moved a distance of $X_1$ in the direction of the optical axis as shown in FIG. 7 showing a state of the most tele angle, the first and fourth lens groups $L_1$ and $L_4$ which move incorporatively with the zoom cam ring 4 are also moved the distance of $X_1$. At this stage, the passive pin 9 which holds the holding frame 102 of the third lens group $L_3$ is moved a distance of $X_2$ from the position shown in FIG. 6 to the position as shown in FIG. 7 in the direction of optical axis along the intersection of the cam slot 14 and the cam groove 44, so that the third lens group $L_3$ is also moved a distance of $X_2$ in the direction of optical axis. The third lens group $L_3$ entails rotative action by the distance y when the third lens group is moved a distance of $X_2$ in the direction of optical axis.

Back to FIG. 2, the focusing operation ring 6 is incorporated between the zooming operation ring 5 and the zoom cam ring 4 in such a manner as to be movably advanced or retreated, gear 82 provided at the rear portion of inner periphery of the focusing operation ring 6 is engaged with a driving gear 111 arranged between the focusing operation ring 6 and the inner tube 1a. With such a mechanism of the focusing operation ring 6 as abovementioned, the maximum amount of movement in the direction of the optical axis of the focusing operation ring 6 will be the sum of maximum amount of movement thereof during the zooming operation and focusing operation. The gear 111 may therefore be arranged to follow the movement of the focusing operation ring 6 to some extent so that the gears 82 and 111 are prevented from becoming excessively large in size in the direction of the optical axis.

The driving gear 111 is connected with a coupler 113 facing the mount portion 2 through a reduction gear 112. The coupler 113 is connected with a coupler on the side of the camera body when the mount 2 is mounted on the camera body and receives a focusing driving force for automatic focusing operation from the side of the camera body to transmit the driving force to the driving gear 111 through the reduction gear 112 so that the focusing operation ring 6 is rotated automatically thus achieving automatic focusing operation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zooming operation apparatus of a zoom lens provided with at least a first and a second lens unit movable in the direction of an optical axis, comprising:
   a stationary barrel secured to a camera body;
   a zooming operation ring only rotatably held by the stationary barrel;
   a zoom cam ring, positioned inside the zooming operation ring and held by the stationary barrel, being movable only rectilinearly in the direction of the optical axis, and moving therewith the first lens unit rectilinearly;
   a first zoom driving mechanism formed at an engaging section where the zooming operation ring is engaged with the zoom cam ring and at a position between the zoom cam ring and the stationary barrel so as to change a rotation of the zooming operation ring to a rectilinear movement of the zoom cam ring; and
   a second zoom driving mechanism formed at a position between the zoom cam ring and the stationary barrel so as to change the rectilinear movement of the zoom cam ring to another rectilinear movement of the second lens unit.

2. A zooming operation apparatus as defined in claim 1, further comprising a focusing mechanism for moving the first lens unit in the direction of the optical axis during a focusing operation, and being arranged to be incorporatively movable with the rectilinear movement of the zoom cam ring during a zooming operation.

3. A zooming operation apparatus as defined in claim 2, wherein the focusing mechanism is provided with a focusing operation ring helicoidally connected with the zoom cam ring by means of helicoid screw.

4. A zooming operation apparatus as defined in claim 3, wherein the zooming operation ring is held by the stationary barrel closer to an image plane than to a position where the first zoom driving mechanism is provided and wherein the distance from the optical axis to the position where the zooming operation ring is held is almost the same as a radius of the focusing operation ring.

5. A zooming operation apparatus as defined in claim 2, wherein the second zoom driving mechanism includes cam grooves provided in both the stationary barrel and the zoom cam ring, and a cam follower on a lens holding frame which holds the second lens unit, said cam follower being engaged with the intersection of the cam grooves.

6. A zooming operation apparatus as defined in claim 3, wherein the focusing mechanism is provided with a rectilinear movement mechanism for only rectilinearly moving the first lens unit during said focusing operation.

7. A zooming operation apparatus as defined in claim 3, wherein the zoom lens is a lens capable of performing automatic focusing, and the focusing operation ring is provided with a gear which engages with a focusing lens driving system connected to the camera body.

8. A zooming operation apparatus as defined in claim 1, wherein the first zoom driving mechanism includes cam in convex projections provided in the inner periphery of the zooming operation ring, passive concaved grooves provided in the zoom cam ring to engage with the cam in convex projections, a straight groove parallel to the optical axis formed in the stationary barrel and a zoom cam ring portion which engages with the straight groove.

9. A zooming operation apparatus as defined in claim 1, further comprising a third lens unit held by the zoom cam ring o as to be incorporatively moved with the rectilinear movement of the zoom cam ring, wherein the second lens unit is provided between the first lens unit and the third lens unit.

10. A zooming operation apparatus of a zoom lens provided with a first and a second lens unit movable in the direction of an optical axis, comprising:
    a stationary barrel secured to a camera body;
    a zooming operation ring rotatably held by the stationary barrel at a portion near an image plane;
    a zooming mechanism having a first cam and a first passive portion to engage therewith, and a second cam and a second passive portion to engage therewith, said zooming mechanism moving the first lens unit in the direction of the optical axis by the first cam and the first passive portion and also moving a second lens unit in the direction of the optical axis by the second cam and the second passive portion corresponding to the rotation of the zooming operation ring;
    a focusing operation ring disposed close to and along the inner peripheral side of the zooming operation ring and being rotatable around the optical axis; and
    a focusing mechanism for moving the first lens unit in the direction of the optical axis by the rotation of the focusing operation ring.

11. A zooming operation apparatus as defined in claim 10, further comprising a zoom cam ring held to the stationary barrel for only rectilinear movement in the direction of the optical axis and said first passive portion being formed therein, wherein the first cam is formed in the inner periphery of the zooming operation ring.

12. A zooming operation apparatus as defined in claim 11, wherein the focusing mechanism is provided with the focusing operation ring helicoidally connected with the zoom cam ring by means of helicoid screw.

13. A zooming operation apparatus as defined in claim 10, wherein the zooming operation ring is formed by plastics.

14. A zooming operation apparatus as defined in claim 10, wherein the focusing operation ring is capable of rotating by a manual operation.

15. A zooming operation apparatus as defined in claim 10, wherein the zoom lens is capable of performing automatic focusing, and wherein the focusing operation ring is provided with a gear which engages with a focusing lens driving system.

16. A zooming operation apparatus as defined in claim 15, wherein the zooming operation ring is further capable of rotating by a manual operation.

17. A zooming operation apparatus as defined in claim 10, wherein the first lens unit is arranged at the most object side of the zoom lens.

18. A zooming operation apparatus as defined in claim 10, wherein the zoom lens is an interchangeable lens.

* * * * *